United States Patent
Hediger (10) Patent No.: US 9,026,251 B2
(45) Date of Patent: May 5, 2015

(54) MONITORING DEVICE FOR POSITION MONITORING A ROBOTIC DEVICE AND PRODUCTION SYSTEM INCLUDING A MONITORING DEVICE

(71) Applicant: Erowa AG, Reinach (CH)

(72) Inventor: Hans Hediger, Reinach (CH)

(73) Assignee: Erowa AG, Reinach (CH)

( * ) Notice: Subject to any disclaimer, the term of this patent is extended or adjusted under 35 U.S.C. 154(b) by 85 days.

(21) Appl. No.: 13/875,133

(22) Filed: May 1, 2013

(65) Prior Publication Data

US 2013/0297071 A1 Nov. 7, 2013

(30) Foreign Application Priority Data

May 4, 2012 (CH) .................................... 00623/12

(51) Int. Cl.
*B25J 9/16* (2006.01)
*B25J 13/08* (2006.01)

(52) U.S. Cl.
CPC .............. *B25J 9/1674* (2013.01); *B25J 13/089* (2013.01); *Y10S 901/49* (2013.01)

(58) Field of Classification Search
USPC .......................... 700/245, 250, 258, 259, 262; 318/568.12, 568.11, 568.16
See application file for complete search history.

(56) References Cited

U.S. PATENT DOCUMENTS

| 4,795,957 | A  | * | 1/1989  | MacNeal et al. ........... 318/568.1 |
|-----------|----|---|---------|-------------------------------------|
| 4,835,711 | A  |   | 5/1989  | Hutchins et al.                     |
| 4,888,877 | A  | * | 12/1989 | Enderle et al. ................... 33/559 |
| 5,189,806 | A  | * | 3/1993  | McMurtry et al. .............. 33/503 |
| 6,327,788 | B1 | * | 12/2001 | Seddon et al. .................. 33/551 |
| 6,577,923 | B1 | * | 6/2003  | White et al. .................. 700/245 |
| 7,712,224 | B2 | * | 5/2010  | Hicks .............................. 33/502 |
| 2011/0000277 | A1 | * | 1/2011 | MacManus .................... 73/1.79 |

FOREIGN PATENT DOCUMENTS

DE 3703725 8/1988
EP 0122147 10/1984

* cited by examiner

*Primary Examiner* — Ronnie Mancho
(74) *Attorney, Agent, or Firm* — Maginot, Moore & Beck LLP (57) ABSTRACT

Proposed is a monitoring device for monitoring and/or sensing predefined positions of a robotic device (5) having at least two axes of motion. The monitoring device comprises at least two sensors (15, 16), the first (15) of which is defined to sense a horizontal position and/or rotative position of the main support (9) and the second sensor (16) a defined horizontal position of the robotic arm (11). The monitoring device comprises furthermore sensor active faces (17a, 18a, 18b) arranged selectively for the first sensor (15) arranged in the horizontal motion zone and/or swiveling zone of the robotic device (5).

27 Claims, 5 Drawing Sheets

MONITORING DEVICE FOR POSITION MONITORING A ROBOTIC DEVICE AND PRODUCTION SYSTEM INCLUDING A MONITORING DEVICE

FIELD OF THE INVENTION

The invention relates to a monitoring device for monitoring and/or sensing predefined positions of a robotic device having at least two axes of motion, comprising a main support rotatable about a vertical axis (Z axis) and a robotic arm supported thereby. In addition, the invention relates to a production system including one such monitoring device.

PRIOR ART

For safe operation of robotic devices, for instance in production systems, precautions must be taken so that any injury to operatives by motion of the robotic device is safely excluded. These precautions involve in addition to active systems such as light barriers, limit switches and the like, mostly also some kind of a barrier in the form of safety fencing. Where the barrier is arranged within the motion zone of the corresponding robotic device it needs to be sufficiently rugged so that the robotic device, namely the robotic arm or the gripper or workpiece cannot penetrate the barrier, as is necessary so that the robotic arm cannot penetrate the barrier because of a malfunction or because of an error in programming or operating the robotic arm. It is, of course, obvious that the complications involved in such a barrier where very heavy transfer motions are involved are enormous, especially since it is usual that tools and particularly workpieces weighing up to 100 kg and more need to be transported by generic robotic devices. Although it is of course possible to site the barrier outside of the motion zone of the robotic device, this is hardly acceptable to production management, especially in requiring a minimum footprint with uncluttered access to machine tools, cribs and the like.

Known from EP 0 122 147 A1 is an industrial robotic device featuring a 320° axis of rotation and a radial axis so that the robotic arm is rotatable and radially shiftable. A radial axis assembly R as shown in FIGS. 1-5 includes a horizontal arm structure 20 which supports a movable carriage 22, a dual rail guidance system comprising rails 62 and 64, a ball screw drive mechanism 30 and a DC servo drive 40 including drive motor 42, tachometer 44 and resolver 46. The horizontal arm structure 20 ends in a gripper G. An end of travel proximity switch 24 is secured to the movable carriage 22 and is aligned with a continuous proximity target plate 25 which extends the length of the prescribed travel of the movable carriage 22. The ends 28 and 29 of the proximity target plate 25 define the end of travel limits of the movable carriage 22. When the proximity switch 24 passes beyond the edge of the proximity target plate 25 a proximity switch signal is transmitted back to the control console RC and the control console RC deenergizes the drive motors of the industrial robotic device. This shutdown action also occurs if the wiring to the proximity switch 24 is broken or damaged. A home location proximity switch 26 is also secured to the movable carriage 22 and is used to indicate a home position for the movable carriage 22 when the control console RC generates a home-seeking command. The radial axis assembly R responds to a home-seeking command by moving the movable carriage 22 toward the theta axis assembly T until the proximity switch 26 detects the proximity target plate 27. The proximity switch 26 then transmits a signal to the control console RC and the control console RC searches for the null position of the resolver 45. This finally positions the movable carriage 22 at its home position. The home position serves as the reference for the starting position-of all program information stored in the memory of the control console RC. An end of travel proximity switch 110, which is attached to the radial axis assembly R, tracks a target plate 112 secured to the housing 82 of theta axis assembly T. As evident from FIG. 8 the target plate 112 covers an angle of approx. 320°. The further limit switch 110 detects the end of travel limits 113 and 115 of the range of movement (rotary motion) by signaling the control console RC to deenergize the drive motor. Thus in this robotic device too, a radial axis, a rotary axis as well as an end position of the carriage are sensed.

Disclosed in U.S. Pat. No. 4,795,957 is a conventional robotic device 10 assigned a table 14 for shifting and rotating in the X and Y direction. As evident from FIGS. 1 and 2 the robotic arm 20 is connected by two paths 56 electrically to an AC power source, the one path of which features three switches S1, S2, S3 connected in series. Each of these three switches S1, S2, S3 is actuated mechanically by being positioned from being closed to open as soon as the robotic arm violates a predefined position, resulting in a power OFF.

The object of the invention is thus to provide a monitoring device for the aforementioned technical field with which specific positions of the robotic device and of the robotic arm can now be actively sensed and/or monitored especially in simplifying the need for any safety barriers, requiring it now simply to be configured safe for access and picking.

Achievement

The achievement of this object is defined by the features of claim 1. As set forth in the invention the monitoring device comprises at least two sensors and sensor active faces assigned to the sensors, said monitoring device sending the robotic device an enabling signal as a function of the signal available at the one and/or other sensor to implement predefined movements, and the first sensor is defined to sense a horizontal position and/or rotative position of the main support and the second sensor a defined horizontal position of the robotic arm, particular in its retracted resting position and sensor active faces are arranged in the horizontal motion zone and/or swiveling zone of the robotic device independently of the selective sensor active faces of the robotic device for the first sensor.

By this design the basic requirement is achieved in enabling specified positions of a robotic device featuring at least two axes of motion to be actively monitored and/or sensed, on the one hand, and, on the other, the robotic device is activated such that it can implement defined movements only in predefined ranges.

The gist of the invention involves now making it possible to, on the one hand, provide sensor active faces for the first sensor within the zone of permitted movements of the robotic device arranged selectively and independently of the robotic device so that when the first sensor is triggered both the robotic device itself and also the robotic arm can be moved, particularly extended. In addition to this, by means of the second sensor a defined horizontal positioning of the robotic arm, particularly in its retracted resting position can now be sensed. By evaluating the two sensor signals a distinction can now be made as to whether the robotic device itself and/or the robotic arm is to be moved or whether the robotic device is generally prohibited from making any movements so that ultimately no injury can occur to operatives.

Unlike conventional systems in which for example light barriers are intended to prevent the robotic arm from entering critical zones by a horizontal movement so that any motion of the robotic device or robotic arm is halted as soon as the light barrier is interrupted, now with the achievement in accordance with the invention it is assured that the robotic device or robotic arm can execute any horizontal movement only within specified, i.e. safe zones, as also applying to extension of the robotic arm, due to, for example, a faulty element or component of the monitoring device in preventing any dangerous situation materializing for anyone involved or the operative since the robotic arm is prevented from entering a no-go zone.

It is understood that the horizontal position of the robotic device or its main support does not need to be monitored directly, it instead now also being possible indirectly via at least one element giving an indication as to the position of the horizontal position of the main support which, for example, may be a baseplate or footing of the robotic device.

In one particularly preferred embodiment the corresponding sensor active faces assigned to the first sensor are arranged fixed in location in defining the zone within which the robotic device is allowed to implement certain movements.

In an alternative example embodiment it is provided for that the sensor active faces assigned to the first sensor are movably arranged in an axis, as a result of which the positions of certain elements, for example a door, are rendered detectable.

In one preferred embodiment of the monitoring device it is proposed to configure at least individual sensors as digital proximity switches at which when activated, make an output signal of 1 available, representing in all a particularly simple and low-cost solution.

In a further embodiment of the monitoring device it is proposed that at least one sensor is an optical sensor, by means of which a predefined position of the robotic device is rendered detectable. An optical sensor has the advantage that between the sensor and the assigned sensor active face a large spacing can be made.

In yet another preferred embodiment the monitoring device includes a sensing controller connected to the sensors for controlling the robotic device so that it is declared free to move only when the first and/or second sensor is activated. Such a sensing controller permits evaluation of the sensor signals in directly influencing the motion of the robotic device.

Preferably the sensing controller controls the robotic device such that any motion of the robotic arm is not enabled until the first sensor is activated in thus enabling the zones to be determined within which the robotic arm is basically allowed to extend.

It is furthermore preferred that the sensing controller controls the robotic device such that enabling horizontal movement of the robotic device as a whole is only allowed when the second sensor is activated in thus making sure that the robotic device can only be moved when the robotic arm is retracted.

Preferably the sensor active faces assigned to the first sensor are arranged only in the zone of permitted motion of the robotic arm, particularly in the region of the floor and especially of machine tools and/or their cribs in thus making it possible for the robotic device to component the machine tools and/or their cribs.

Preferably when the robotic device is arranged stationary but swivable the monitoring device features curved sensor active faces arranged in the swivelling zone of the robotic device and assigned to the first sensor to thus make it possible to select specific portions within the swiveling zone of the robotic device within which the robotic arm is basically permitted to extend.

Preferably the second sensor is arranged on a vertical slide supporting the robotic arm on which a sensor active face assigned to the second sensor is arranged to output a 1 signal at the second sensor as soon as the robotic arm is in its retracted resting position, thus making for a particularly simple solution in monitoring the retracted resting position of the robotic arm.

In another preferred embodiment for monitoring horizontal positions of a robotic device arranged to travel in one direction (Y direction) the monitoring device comprises sensor active faces running parallel and/or transversely to the Y direction in being assigned to the first sensor in thus making it possible to design the sensor active faces simple and cost-effective for speedy and simple fitting.

A further preferred embodiment of the monitoring device serves to monitor and/or sense given positions of a robotic device whose main support is supported by means of a rotatable footing on a baseplate on which at least two sensors are arranged at an angle to each other and sensor active faces cooperate with the cited sensors is arranged so that in predefined rotational positions of the main support one of the sensors is activated. This variant is particularly suitable in a situation when the robotic device needs to access only a very few positions.

For monitoring a robotic device for travelling in one direction (Y direction), the main support of which is supported by a rotatable footing on a baseplate the monitoring device has preferably at least two sensors at an angle to each other on the baseplate of the robotic device which cooperate with sensor active faces located in the region of the floor such that in predefined shifted positions of the robotic device in the Y direction one of the sensors is activated. This is a further simple variant when the robotic device is required to access only very few positions.

Particularly preferred, the monitoring device serves to monitor a robotic device, the robotic arm of which is shiftable in the horizontal direction and in relation to the main support only along an axis. With such a robotic device it is particularly simple to monitor the retracted horizontal position of the robotic arm by means of the second sensor. A horizontal movement of the robotic arm in relation to the main support is, in addition, the motion which may be in the direction of the barrier in thus endangering operatives.

A further object of the invention involves providing a monitoring device by means of which a robotic device of a production system can now be safely operated by reliably preventing executing any prohibited horizontal movements away from the cribs and machine tools by the robotic device and especially the robotic arm.

The object is achieved by the production system being provided with a monitoring device comprising at least two sensors, a sensor active face being arranged in the zone of the crib to be componented by means of the robotic device or the machine tool to be componented such that the first sensor is activated by each sensor active face when the robotic device is in the loading zone or unloading zone of the corresponding crib or the corresponding machine tool whilst the second sensor is arranged on the robotic device such that a defined horizontal position of the robotic arm, particularly its retracted resting position can be sensed in thus ensuring that the robotic device is capable of executing certain movements only in the zone of a machine tool or a crib.

In one preferred embodiment of the production system the horizontal extent of each sensor active face is selected so that when the sensor is activated the robotic device can be traveled by a predefined amount and/or swivelled about a predefined angle in thus basically ensuring that the robotic device can be moved so far that all zones of the crib or machine tool to be componented are accessible to the robotic device.

In a further preferred embodiment of the production system is second sensor is activated when the robotic arm is in a retracted resting position in thus enhancing the positive safety of the system.

Preferably in a further advantageous embodiment of the production system the sensing controller will only okay a motion to the robotic device when at least one of the two sensors is in the activated condition, this too, enhancing the positive safety of the system.

In conclusion, in a further preferred embodiment of the production system it is provided for that an okay to motion of the robotic device by means of the sensing controller is instantly negated when none of the two sensors is in the activated condition in thus making sure that the robotic device is instantly halted even when already on the move in preventing any danger to operatives. This precaution also prohibits any movement of the robotic device in case there is a defect in one of the elements of the monitoring device in, likewise, ultimately contributing towards positive safety of the system.

Further advantageous embodiments and feature combinations of the invention will now be detailed in the following and from the claims as a whole.

BRIEF DESCRIPTION OF THE DRAWINGS

The invention will now be detailed with reference to the drawings in which.

It is understood that all parts same to the FIGs. are identified by the same reference numerals.

IMPLEMENTING THE INVENTION

Figure 1:
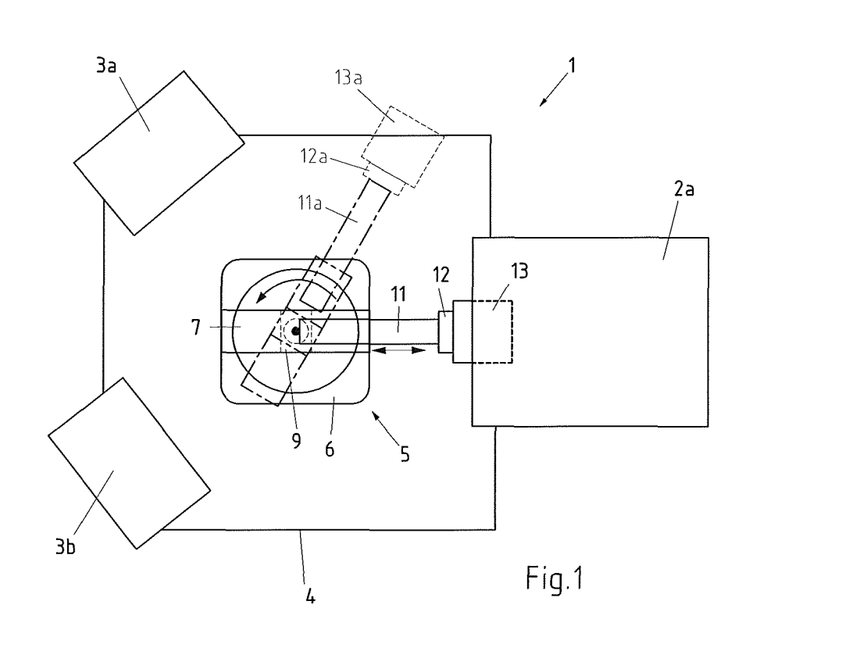
FIG. 1 is a top-down view of a production system configured as per prior art.

Referring now to FIG. 1 there is illustrated diagrammatically in a top-down view a production system 1 configured as per prior art. The production system 1 comprises for example a machine tool 2a, two cribs 3a, 3b, a fencing enclosure 4 as well as a robotic device 5. It is understood that the term robotic device is used in each case representative of all embodiments of manipulators.

The cribs 3a, 3b serve to accommodate tools and/or workpieces. The machines involved may be, for example, and not listed conclusively, eroding, milling, grinding, gauging machines or lathes. An example of a suitable robotic device is one having four axes the coupling element—gripper—of which is movable in three translation axes X, Y and Z as well as in the rotational axis C. The robotic device 5 comprises a baseplate 6 on which a main support 9 stands vertically by means of a footing 7. Mounted on the main support 9 rotatable about a vertical axis is a vertically travelling slide (not shown). Mounted on the vertical slide is a horizontal travelling cantilevered robotic arm 11 ending in a gripper 12 serving to grip and hold a tool and/or workpiece 13 indicated diagrammatically (termed for simplicity hereinafter simply as workpiece). Indicated by broken lines in addition is a rotative position of the main support 9 together with the robotic arm 11a, gripper 12a and a workpiece 13a. Any horizontal motion of the robotic arm 11a relative to the main support 9 particularly in the direction of the fencing enclosure 4 can only be made in a single axis, namely along a linear horizontal axis. Since the basics in configuring such a robotic device are known, no further details are included here.

The robotic device 5 arranged within the fencing enclosure 4 serves particularly to feed and pick workpieces 13 to/from the machine tool 2a, they being picked from and fed to the cribs 3a, 3b.

Because of footprint considerations the fencing enclosure 4 is normally arranged as far as possible within the reach of the robotic device, this being the reason why such a fencing enclosure 4 needs to be configured as safety fencing, it serving to prevent any hazardous access by operatives whilst, however, ensuring that the robotic arm 11 or its gripper 12 cannot penetrate the fencing enclosure 4 with some tool or workpiece 13. The need for this is because when the robotic device 5 is rotated with the robotic arm 11a extended the gripper 12a or any workpiece 13a could penetrate the fencing enclosure 4 constituting a potential hazard to life and limb of operatives were the fencing enclosure 4 not configured correspondingly rugged. It is understood that the complications in providing such a fencing enclosure 4 in view of the high weights in transfer are enormous, especially since it is often the case that tools and particularly workpieces weighing up to 100 kg and more need to be handled by the generic robotic devices.

Figure 2:
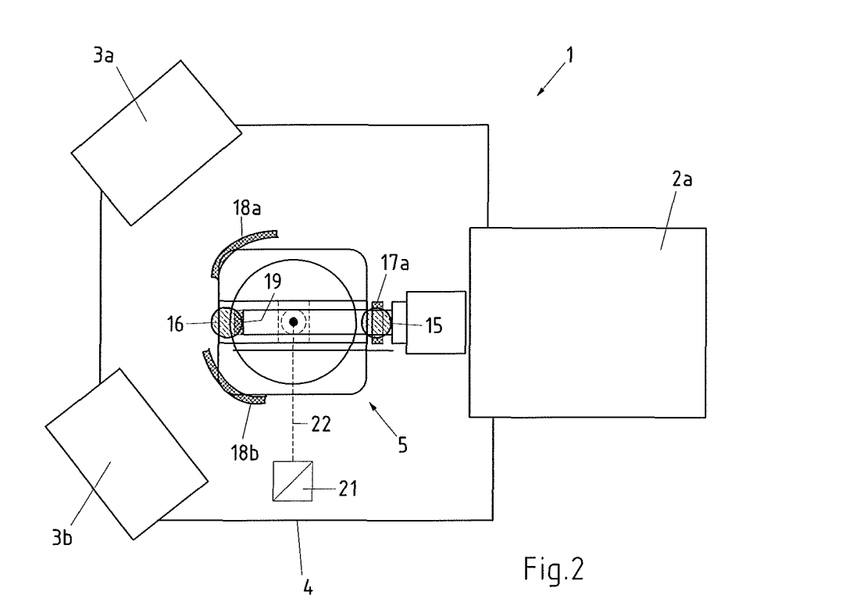
FIG. 2 is a top-down view of the production system as shown in FIG. 1 together with a first embodiment of a monitoring device in accordance with the invention.

Referring now to FIG. 2 there is illustrated in a diagrammatically top-down view of the production system as shown in FIG. 1 together with a first embodiment of a monitoring device in accordance with the invention. The monitoring device comprises a first sensor 15, a second sensor 16, three horizontal disposed sensor active faces 17a, 18a, 18b, a vertical disposed sensor active face 19 as well as a sensing controller 21 connected both with the sensors 15, 16 as well as with the robotic device 5 as indicated by a connecting line 22. The first sensor 15 is arranged on the baseplate 6 of the robotic device 5 whilst the second sensor 16 is fixed to the vertical slide (not shown).

The three horizontal disposed sensor active faces 17a, 18a, 18b are arranged independently of the robotic device fixed in the area of the floor such that the first sensor 15 on rotation of the robotic device 5 is traveled substantially along, i.e. above the corresponding sensor active faces 17a, 18a, 18b so that the first sensor 15 can cooperate with the corresponding sensor active faces 17a, 18a, 18b. Independently of the robotic device means that the sensor active faces 17a, 18a, 18b are not arranged on the robotic device itself in thus also not being included in movements of the robotic device.

The two sensors 15, 16 are configured as digital proximity switches by the signal UA 0 being available at the output as long as they are not in the vicinity of a sensor active face. As soon as a critical minimum spacing between the first sensor 15 and an associated sensor active face 17a, 18a, 18b is violated a signal UA 1 is available at the output of the first sensor 15. This situation is similar to that between the second sensor 16 and the sensor active face 19 arranged vertical disposed at the end of the robotic arm. As soon as the robotic arm 11 is parked in the retracted resting position, i.e. retracted to the rear a signal 1 is available at the output of the second sensor 16. In this situation, however, only the cited one sensor active face 19 can cooperate with the second sensor 16. The first sensor active face 17a is configured in such a way and arranged in front of the machine tool 2a that the first sensor 15 is activated when the robotic device 5 faces the machine tool 2a. As soon as the first sensor 15 is activated the robotic device 5 is enabled by the sensing controller 21 so that the robotic arm 11 can be moved for loading or unloading the machine tool 2a in especially being moved horizontally. In the retracted position of the robotic arm 11 namely when the second sensor 16 is activated by the assigned sensor active face 19 the robotic device 5 can be traveled as a whole horizontally in a direction (Y direction) and rotated about the vertical axis (Z axis).

The first sensor active face 17a has such a length that the robotic device, when the first sensor 15 is activated, can be swivelled about a predefined angle facing the machine tool 2a in thus assuring safe access to all areas of the machine tool 2a. This applies likewise to the two sensor active faces 18a, 18b arranged facing the cribs 3a, 3b, and also being configured bent/curved to permit rotating/swiveling the robotic device 5 about a predefined angle.

The sensors function preferably on an inductive basis by generating an electromagnetic field which can be influenced by the sensor active face namely a damping material in the form of an electrically conductive metal. As soon as a defined minimum spacing between sensor and the cited sensor active face—metal—materializes, the output signal UA of the sensors 15, 16 changes from 0 to 1. Since there is a wealth of different embodiments of such sensors acting as proximity switches and also a wealth of different shapes and materials in influencing the field emitted by the sensor, the present context relates only to sensor and sensor active face, it being understood that this is intended to include all embodiments of proximity switches or the like.

Preferably the sensor active faces consist of a sheet or coating of metal sited correspondingly but in any case preferably configured passively.

In the position as shown in FIG. 2 in which both the first sensor 15 and the second sensor 16 are sited in the activation region of a sensor active faces 17a, 19 a signal UA of 1 is thus available at the output of both sensors. To decide whether the robotic device 5 is permitted to be rotated and/or the robotic arm 11 extended horizontally the sensing controller 21 tests whether at one of the two sensors a signal UA of 1 is available. When this is the case (UA first sensor+UA second sensor≥1) the robotic device 5 can be moved. But it is always the case that any movement is only enabled when the first and/or second sensor is in the activated state, this being, however, a state which should not occur in operation.

It is understood that a sensor active face in conjunction with the second sensor 16 must not necessarily be confined to a "face", for depending on the sensor involved it may be sufficient to provide an object, a body, a spot etc. to which the second sensor 16 responds when in the proximity. But in conjunction with the first sensor 15 a sensor active face is needed which incorporates a certain surface area and thus a certain extent. It is understood, however, that, of course, such a face can be made up of a plurality of small areas or spots. It is understood also that in addition to inductive sensors it is just as possible to make use of capacitive, magnetic, optical or ultrasound based sensors.

It is understood that the sensing controller 21 must not necessarily be configured as a separate unit, but it may be a component of the machine controller.

Figure 3:
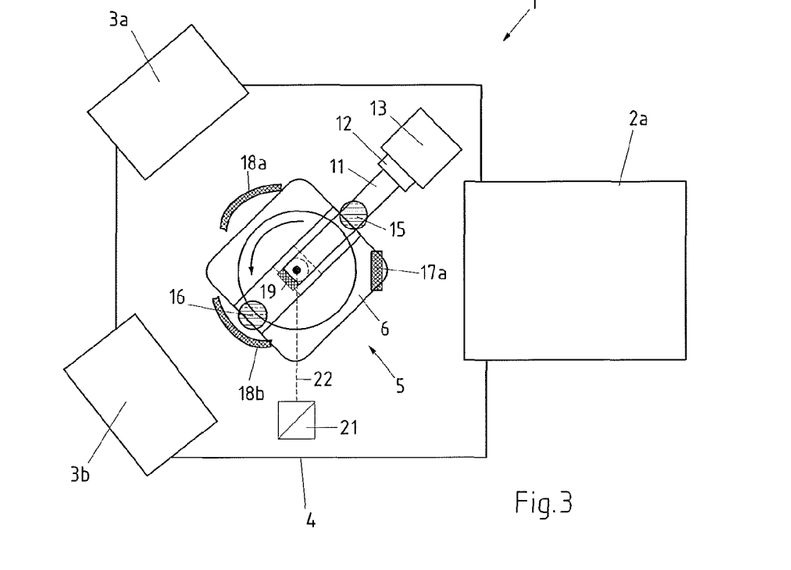
FIG. 3 is a further top-down view of the production system as shown in FIG. 2.

Referring now to FIG. 3 there is illustrated the production system as shown in FIG. 2 together with the monitoring device, the robotic device 5 being depicted in a rotative position with the robotic arm 11 partly extended. Since the first sensor 15 is not in the active zone of a sensor active faces 17a, 18a, 18b the robotic device 5 is only allowed to swivel, but only when also the robotic arm 11 is in the retracted condition so that the second sensor 16 is activated by the sensor active face 19. In the illustration as shown in FIG. 3 the robotic arm 11 is partly extended, however, as a result of which the second sensor 16 is no longer in the active zone of the sensor active face 19. Were the robotic arm 11 to be extended further there would be the danger of it penetrating the fencing enclosure 4 which needs to be prohibited in all certainty. This is why the robotic device in the condition as shown in FIG. 3 is instantly switched OFF since the addition of the two sensor output signals results in 0 (UA first sensor+UA second sensor=0) in thus no longer satisfying the requirement (UA first sensor+ UA second sensor≥1). When the addition of the two sensor output signals results in a 0, this instantly halts the robotic device as indicated by an error signal.

It is thus always the case that the monitoring device is inherently safe since at least one of the sensors 15, 16 must have an output signal UA of 1 to permit any motion of the robotic device at all. This makes sure that even when there is a failure in a sensor, an open circuit in the connecting lead, a software malfunction or the like the robotic device can always be prevented from assuming a prohibitive operating condition or assuming a position hazardous to operatives.

But by evaluating the sensor signals the predefined positions of the robotic device can be sensed.

In addition to the cribs and the machine tool as described generic robotic devices are also suitable for loading and/or unloading equipping stations, loading stations as well as infeed and outfeed locations without this itemization being conclusive.

Figure 4:
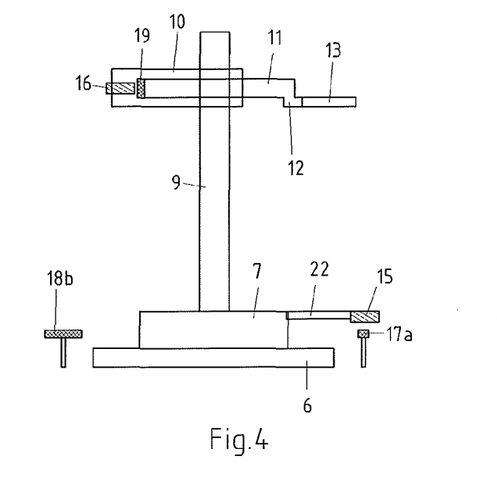
FIG. 4 is a first side view of the production system as shown in FIG. 2.

Referring now to FIG. 4 there is illustrated the robotic device together with the salient elements of the monitoring device in a side view. Evident from this illustration in addition to the main support 9 are the vertical slide 10 of the robotic device 5 particularly the arrangement of the first sensors 15, 16 as well as the assignment of the sensor active faces 17a, 18b, to the sensors 15, 16. The first sensor 15 is secured to the footing 7 of the robotic device 5 by means of a connecting line 22. In swivelling the robotic device 5 the first sensor 15 rotates together with the footing 7. The sensor active faces 17a, 18b are oriented substantially horizontal, i.e. parallel to the floor to which they are secured by means of supports, a specific spacing existing vertically between the sensor active faces 17a, 18b and the first sensor 15. The second sensor 16 is secured to the rear side of the robotic arm 11 in being oriented substantially vertical. The sensor active face 19 assigned to the second sensor 16 is fixedly connected to the vertical slide 10. In this example the first sensor 15 is activated by the sensor active face 17a whilst the second sensor 16 is activated by the sensor active face 19. This is why a signal UA of 1 is available at the output of both sensors 15, 16.

Figure 5:
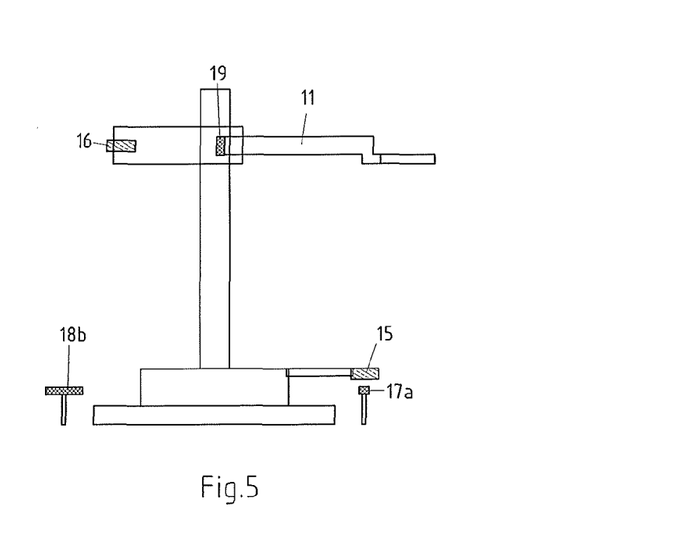
FIG. 5 is a further side view of the production system as shown in FIG. 2.

Referring now to FIG. 5 there is illustrated the production system as shown in FIG. 4 in which the robotic arm 11 is depicted in a forward extended position in which the first sensor 15 is activated by the sensor active face 17a whilst the second sensor 16 is not activated since the corresponding sensor active face 19 is too far away. This is why a signal UA of 1 is applied to the output of the first sensor 15 whilst a signal UA of 0 is applied to the output of the second sensor 16.

Basically the sensors and especially also the first sensor may be arranged on the side of the robotic device, the sensor active faces of which may be oriented also vertically or slanting, if necessary.

Figure 6:
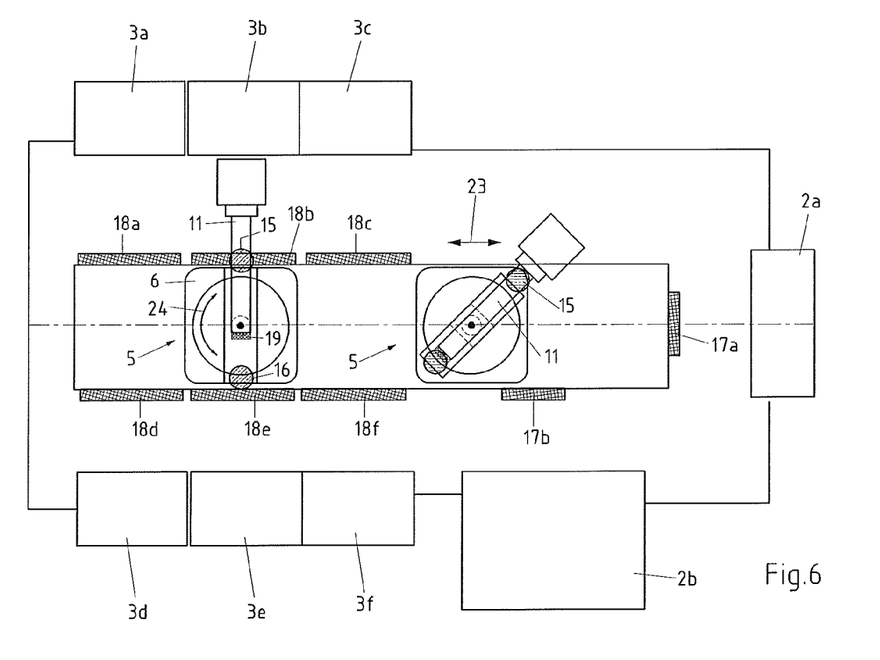
FIG. 6 is a top-down view of a further production system together with a further embodiment of the monitoring device in accordance with the invention.

Referring now to FIG. 6 there is illustrated an alternative example embodiment of the invention together with a production system. In this example the production system comprises a robotic device 5 six cribs 3a-3f, two machine tools 2a, 2b as well as a fencing enclosure 4. The robotic device 5 is arranged by means of its baseplate 6 on a main slide (not shown) for travelling horizontal in the Y direction, the main support 9 being rotatably supported on the baseplate 6. The Y direction is indicated by the two-way arrow 23 whilst the direction of rotation about the Z axis is indicated by a further two-way arrow 24. In addition to the vertically oriented sensor active face 19 arranged at the rear end of the robotic arm 11 the monitoring device comprises a total of eight further sensor active faces 17a, 17b, 18a-18f each assigned to a machine tool 2a, 2b or one of the cribs 3a-3f. In addition to the cited sensor active faces the monitoring device comprises also two sensors 15, 16 as well as a sensing controller (not shown). The first sensor 15 is arranged at the footing 7 of the robotic device 5 whilst the second sensor 16 is fixed to the vertical slide (not shown). The robotic device 5 is shown in two different positions. In the left-hand position the first sensor 15 is located above a sensor active face 18b. In this position the robotic arm 11 has access to the corresponding crib 3b for picking or placing workpieces. The right-hand position of the robotic device 5 shows a position in which the robotic arm 11 is retracted so that the second sensor 16 is activated, whereas the first sensor 15 is not activated since it is located outside of the sensor active faces 17a, 17b, 18a-18f. This results in a signal UA of 0 being available at the first sensor whilst a signal UA of 1 is available at the second sensor. Since the addition of the two sensor output signals 1 results in (UA first sensor+UA second sensor=1) the robotic device can be travelled in this condition horizontally and/or swivelled.

The sensor active faces 17a, 17b, 18a-18f extend horizontally to such an extent that the robotic device 5, when the first sensor 15 is activated, can travel or swivel along the corresponding sensor active face in the Y direction so that the robotic device 5 has unrestricted access to the corresponding machine tool 2a, 2b or the corresponding crib 3a-3f and each machine tool 2a, 2b as well as each crib 3a-3f can be safely loaded and unloaded by means of the robotic device 5.

The horizontally oriented sensor active faces are arranged only in zones in which specific movements of the robotic device or robotic arm are basically allowed. With reference to the present example horizontal oriented sensor active faces are arranged in the region of the cribs as well as the machine tools so that the first sensor is activated when the robotic device is located facing one of the cribs or a machine tool.

The horizontally oriented sensor active faces serve concretely to define zones within which the robotic device is allowed to extend its robotic arm in the horizontal direction. For cooperation of sensor and sensor active faces a digital response in the form of a 1 or 0 signal is sufficient, whereby the signals from the monitoring device are evaluated in such a way that a 1 signal enables movements of the robotic device (positive safety) whilst when an 0 signal is available no movements of the robotic device are enabled.

Figure 7:
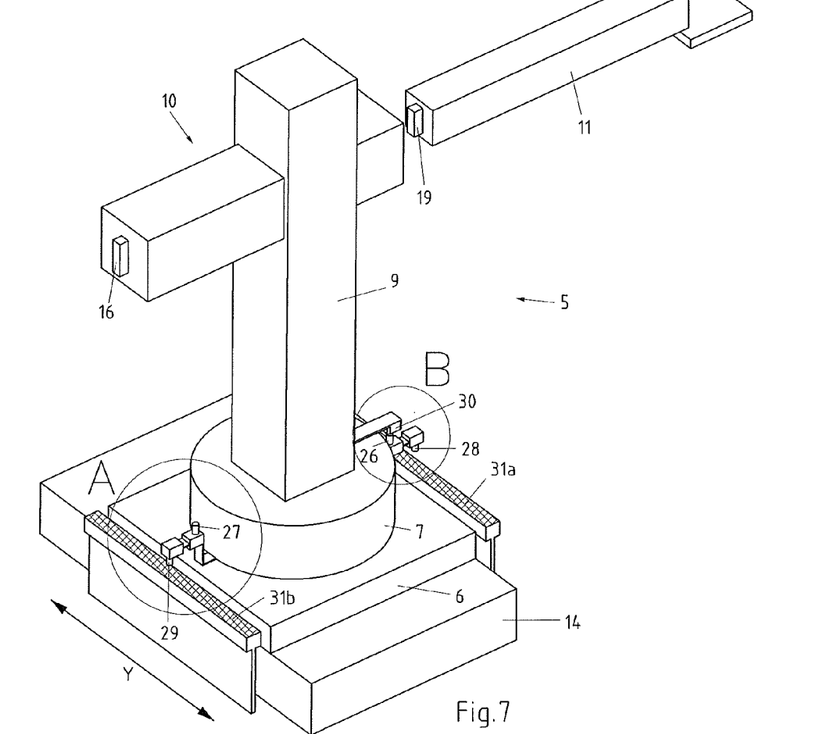
FIG. 7 is a view of a robotic device shown together with an alternative example of a monitoring device in accordance with the invention.
Figure 7A:
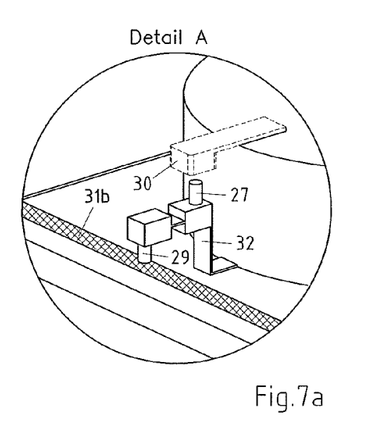
FIG. 7a is a magnified view of part of that as shown in FIG. 7.
Figure 7B:
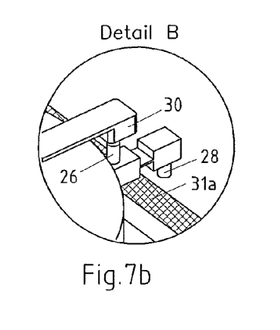
FIG. 7b is a further magnified view of part of that as shown in FIG. 7.

Referring now to FIG. 7 there is illustrated a robotic device 5 together with an alternative example embodiment of a monitoring device whilst FIG. 7a depicts a magnified view of part of that as shown in FIG. 7, and FIG. 7b is a further magnified view of part of that as shown in FIG. 7. Here again by means of its baseplate 6 serving as a main slide the robotic device 5 is arranged for travelling along a rail 14 running in a Y direction whilst the main support 9 is arranged rotatable on the baseplate 6 by means of a footing 7. The robotic arm 11 is shown in its extended condition. In addition to the second sensor 16 arranged on the rear side of the vertical slide 10 for monitoring the horizontal position of the robotic arm 11, the monitoring device comprises four further sensors 26, 27, 28, 29 as well as several sensor active face 19, 30, 31a, 31b. The sensor 16 arranged on the rear side of the vertical slide 10 is designed to cooperate with the sensor active face 19 arranged on the rear end of robotic arm 11. In this example too, the monitoring device comprises a sensing controller (not shown to make for an uncluttered illustration).

Two sensors 26, 28; 27, 29 each are placed offset by 180° to each other, diametrically opposed to the footing 7 of the robotic device 5. The four sensors 26, 27, 28, 29 are fixedly connected to the baseplate 6 in not rotating together with the footing 7. These four sensors 26, 27, 28, 29 are connected to the baseplate by means of brackets, only one of which, the front bracket 32 is evident from FIG. 7a. The electric fields of both sensors 26, 27 facing the footing 7 are directed upwards, whilst the electric fields of the two sensors 28, 29 facing away from the footing 7 are directed downwards in the direction of the sensor active faces 31a, 31b applied to the floor. Arranged on the footing 7 is a further sensor active face 30 designed to cooperate with the two sensors 26, 27 facing away from the footing 7. With rotation of the main support 9 the footing 7 together with the sensor active face 30 is included in rotation. Rotation of the robotic device thru 180° from the position as shown in FIG. 7 includes likewise rotation of the sensor active face 30 thru 180° so that the latter is located above the second sensor 27, as shown in FIG. 7a. Thus in this example embodiment two positions of the robotic device 5 rotated 180° to each other can be sensed. It is understood that, where necessary, other such positions of the robotic device 5 rotated thru 90°, for example, can also be sensed by adding one or more sensors correspondingly arranged, Preferably the two sensors 28, 29 facing downwards are the assigned sensor active faces 31a, 31b arranged on the floor or on a rail (not shown) along which the main slide can travel.

In the example embodiment as shown either the two sensors 26 and 28 on the one side, or the two sensors 27 and 29 arranged on the other side must have an output signal of 1 so that the robotic arm 11 can be horizontally extended. So that the robotic device can be travelled in the Y direction the second sensor 16 on the rear side of the robotic arm 11 must have an output signal of 1. As soon as the second sensor 16 has an output signal of 1 the robotic arm 11 is in its retracted position. As soon as none of the sensors has an output signal of 1 the robotic device is instantly powered OFF and an alarm signal sounded.

For the two outer sensors 28, 29 facing away from the footing 7 sensor active faces 31a, 31b are provided arranged on the floor, it being understood that in this case as an example only these two are depicted. When the robotic device is travelled axially along the Y axis the sensors 26-29 arranged on the baseplate 6 as well as the sensor active face 30 are included in the movement, whereas the sensor active faces 31a, 31b are arranged fixed to the floor.

The number and positions of the sensor active faces arranged fixed depends on how many cribs or machine tools need to be loaded and unloaded by means of the robotic device. Where, for instance, a machine tool and/or a crib is also arranged transversely or at an angle to the travel direction of the robotic device 5 a further sensor (not shown) or a further sensor active face (not shown) could be provided arranged offset from the sensors or sensor active faces as shown by a predefined angle of, for example 45° or 90°. Such an embodiment is particularly favorable when only a few positions need to be accessed.

Figure 8:
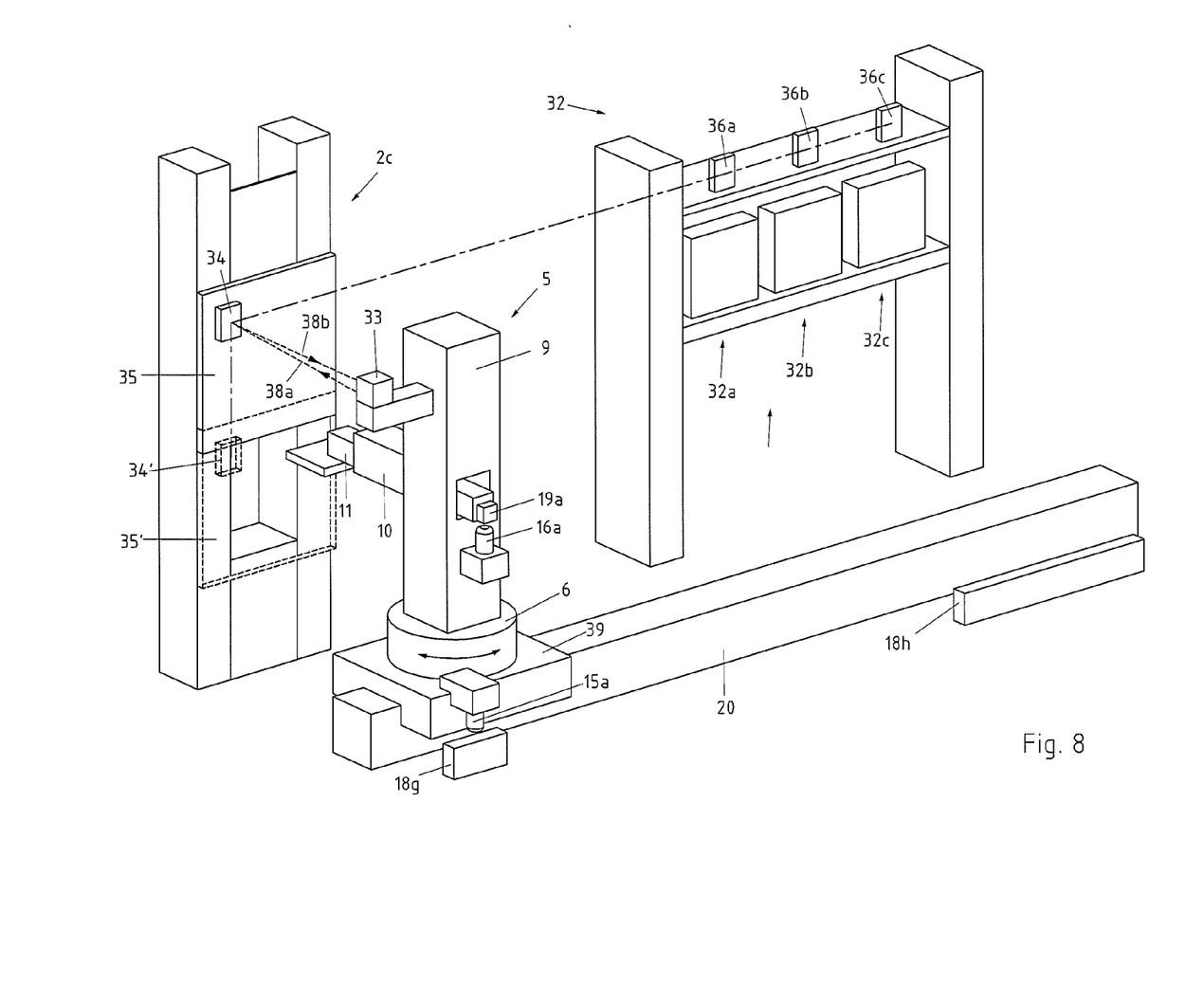
FIG. 8 is a view of an alternative example embodiment of the invention.

Referring now to FIG. 8 an alternative example embodiment of the invention will now be explained. Here, FIG. 8 shows a further production system as an example incorporating an alternative example embodiment of the invention. Like the example embodiment as shown in FIG. 6 the production system now comprises a robotic device 5, the main support 9 of which is rotatably supported on a base plate 6. The base plate 6 is arranged on a main slide 39 for travelling in a horizontal direction (Y direction) along a rail 20. In addition to the robotic device 5 the production system comprises a machine tool 2c and a crib 32. One main difference to the example embodiments described above is that the first sensor is not configured as a proximity switch and is also not arranged near to the floor, it instead being secured topping the main support 9 and configured as an optical sensor device, termed sensor 33 hereinafter. The optical sensor 33 comprises a light module which emits light as well as a detector module which receives light (neither the light module nor the detector module are shown). Arranged on the machine tool 2c is a first sensor active face 34 assigned to the optical sensor 33 whilst the crib 32 is provided, for example, with three further sensor active faces 36a, 36b, 36c which are likewise assigned to the optical sensor 33. Employed as sensor active faces 36a, 36b, 36c are optical reflectors which reflect the light beam 38a emitted by the sensor 33 or its light module in the direction of the sensor or its detector module. Each optical reflector and the detector module are tuned to each other so that the detector module only responds to the light emitted from the emitter and reflected by the optical reflector or detects it, filtering it out and evaluating it. The sensor active faces 36a, 36b, 36c cover a certain area within which the incoming light beam is reflected through approx. 180° in the direction of the sensor 33. Since generic sensor devices are known no further details are included at this point. One example of such a sensor device is the "SRK 96" safety reflection light barrier made by the firm Leuze electronic.

The first sensor active face 34 is arranged on a door 35 movable in the vertical direction, the door forming a component of the machine tool 2c. The three further sensor active faces 36a, 36b, 36c are arranged fixed in position above each push-back location 32a, 32b, 32c of the crib 32.

The sensor as well as each reflector are preferably arranged above the operative access zone, i.e. at least approx. 2 m above the floor so that operatives can move below the light beam without obstructing it.

In addition to the optical sensor 33 the monitoring device comprises at least one further sensor. A sensor 16a in the form of a proximity switch can be put to use as the further—second—sensor, as already explained above. In this example the second sensor 16a is secured to the main support 9 whilst the associated sensor active face 19a is arranged on the rear side of the robotic arm 11 that an output signal of 1 is available at the second sensor 16a as soon as the robotic arm 11 is in the retracted resting position.

In addition, further sensors and corresponding active faces may be provided as indicated by the sensor 15a arranged on the footing and the two active faces 18g, 18h. But in any case the optical sensor 33 may be certainly combined with further sensors in finding an optimum solution in each case of application.

The functioning of the robotic device 5 will now be discussed in more detail particularly in conjunction with the optical sensor 33. As long as the robotic arm 11 is in the rear resting position, i.e. in the retracted rear position, as is signalled by a signal UA=1, the robotic device 5 can be travelled along the rail 20. So that the robotic device 5 receives an enable signal for loading or unloading the machine 2c, the light beam 38 emitted by the sensor 33 must be detected by the detector module of the sensor 33. The detector module detects the light beam when the robotic device 5 is in a predefined position facing the machine 2c so that the emitted light beam 38a is reflected from the sensor active face 34 in the direction of the detector module. But for this to happen, the door 35 must be in the UP enabling position as shown in FIG. 8. If the door 35 is in the DOWN closed position, as indicated by the broken line indication of the door 35' then the light beam is not reflected in the direction of the detector module from the sensor active face 34' even when the robotic device 5 is precisely positioned facing the machine 2c. This is a further advantage of the sensor 33 and an additional safety measure by the robotic device 5 having access to the machine 2c only when the door is opened, i.e. UP.

To be able to serve the crib 32 the robotic device 5 must face one of the three push-back locations 32a, 32b, 32c of the crib 32. To detect the correct loading or unloading position of the robotic device 5 each of the three push-back locations 32a, 32b, 32c is assigned a sensor active face 36a, 36b, 36c. As soon as the robotic device is facing one of these three push-back locations 32a, 32b, 32c the light emitted from the sensor is reflected in the direction of the detector module and the robotic device 5 is enabled so that it can serve the corresponding push-back location 32a, 32b, 32c.

Since the sensor active faces 34, 36a, 36b, 36c cover a certain extent a predefined zone materializes both horizontally as well as vertically within which the light emitted by the sensor is still reflected in the direction of the detector module. It is particularly the horizontal extent of each sensor active face 34, 36a, 36b, 36c that allows that the robotic device must be located in the horizontal direction within a predefined zone facing each of the push-back locations 32a, 32b, 32c of the crib 32 or facing the machine 2c so that the monitoring device receives from the sensor 33 an enable signal to serve the machine or the crib. This zone can thus be determined or varied over the width of each sensor active face 34, 36a, 36b, 36c.

Since the height of the sensor 33 secured to the main support is fixed, especially tolerances such as any mechanical play of the robotic device, thermal expansions of the materials etc. need to be compensated for in the vertical extent of each sensor active face 34, 36a, 36b, 36c.

If, for instance, no sensor 33 can be mounted on the machine tool at the wanted height, the sensor 15a can be made use of. Where necessary, a sensor 33 movable in the vertical direction could be provided.

In summary it will thus be appreciated that with a monitoring device configured in accordance with the invention highly safe operation is now assured whilst enabling the safety fencing to be simplified since it must now merely serve as an access protection for operatives. Such a safety fencing now no longer needs to be engineered so rugged that it must always be capable of preventing a penetration of the robotic device or robotic arm even in worst case conditions, namely at high robotic device speeds and high transfer weights. In addition to this, the safety fencing can now be maintained lower and closer making ultimately for lower costs. By linking the sensor signals and the robotic device controller as explained it is now assured that the robotic device or robotic arm cannot reach the immediate vicinity of the safety fencing with the risk of it being penetrated. Thus as compared to existing safety fencing this can now be engineered simple, lightweight and cost-effective.

The monitoring device configured in accordance with the invention is particularly suitable for robotic devices on which the robotic arm can be horizontally travelled in one axis of movement only, particularly in a horizontal linear axis.

It is understood that the term sensor active faces is intended to include all means prompting activation—switching action—of the sensor when approached. In addition to diverse metals compatible for example with an inductive sensor, other sensor active faces such as also optical, magnetic, acoustical versions, to name just a few, for example, are just as compatible with the invention.

LIST OF REFERENCE NUMERALS 1 production system
2 machine tool
3 crib
4 fencing enclosure
5 robotic device
6 base plate
7 footing
8 main slide
9 main supporting
10 vertical slide
11 robotic arm
12 gripper
13 workpiece
14 rail
15 sensor
16 sensor
17 sensor active face
18 sensor active face
19 sensor active face
20 rail
21 sensing controller
22 connecting line
23 arrow (Y direction)
24 arrow (C axis)
26 sensor
27 sensor
28 sensor
29 sensor
30 sensor active face
31 sensor active face
32 crib
33 sensor
34 sensor active face
35 door
36a-c sensor active face
38 light beam
39 slide

What is claimed is:

1. A monitoring device for monitoring and/or sensing predefined positions of a robotic device, the robotic device having at least two axes of motion, the monitoring device comprising a main support rotatable about a Z axis and a robotic arm supported thereby, the monitoring device comprising at least two sensors and corresponding sensor active faces assigned to each of said at least two sensors, and said monitoring device operable to send to the robotic device an enabling signal as a function of a signal available at one of the at least two sensors to implement predefined movements, wherein a first sensor of said at least two sensors is defined to sense a horizontal position and/or rotational position of the main support and a second sensor of said at least two sensors is defined to sense a horizontal position of the robotic arm, particularly in its retracted position and selective ones of said sensor active faces are arranged in the horizontal motion zone and/or swivelling zone of the robotic device independently of the robotic device for the first sensor.

2. The monitoring device as set forth in claim 1, wherein corresponding sensor active faces assigned to the first sensor are arranged fixed in location.

3. The monitoring device as set forth in claim 1, wherein at least one of the sensor active faces assigned to the first sensor is arranged movable in an axis and independently of the robotic device.

4. The monitoring device as set forth in claim 1, wherein at least some of said at least two sensors are configured as digital proximity switches at which when activated an output signal of 1 is available.

5. The monitoring device as set forth in claim 1, wherein at least one sensor of said at least two sensors is an optical sensor, by means of which a predefined position of the robotic device is detectable.

6. The monitoring device as set forth in claim 1, wherein said monitoring device includes a sensing controller connected to the at least two sensors for controlling the robotic device so that it is declared free to move only when the first and/or second sensor is activated.

7. The monitoring device as set forth in claim 6, wherein said sensing controller controls the robotic device such that motion of the robotic arm is not enabled until the first sensor is activated.

8. The monitoring device as set forth in claim 6, wherein said sensing controller controls the robotic device such that enabling horizontal movement of the robotic device as a whole is only allowed when the second sensor is activated.

9. The monitoring device as set forth in claim 1, wherein said sensor active faces assigned to the first sensor are arranged only in the zone of permitted motion of the robotic arm, and especially in the region of a machine tool and/or a cribs.

10. The monitoring device as set forth in claim 1 for monitoring the positions of a robotic device arranged fixed but swivelable, wherein said curved sensor active faces are arranged in the swivelling zone of the robotic device and assigned to the first sensor.

11. The monitoring device as set forth in claim 1, wherein said second sensor is arranged on a vertical slide supporting the robotic arm at which a sensor active face assigned to the second sensor is arranged such that an output signal of 1 is output at the second sensor as soon as the robotic arm is in its retracted resting position.

12. The monitoring device as set forth in claim 1 for monitoring the horizontal positions of a robotic device arranged to travel in a Y direction, wherein the monitoring device comprises sensor active faces running parallel and/or transversely to the Y direction in being assigned to the first sensor.

13. The monitoring device as set forth in claim 11 for monitoring a robotic device whose main support is supported by means of a rotatable footing on a baseplate, wherein said monitoring device comprises at least two sensors arranged at an angle to each other on the baseplate of the robotic device as well as a sensor active face arranged on a rotatable footing and cooperating with the other sensors of said at least two sensors arranged so that in predefined rotational positions of the main support one of the sensors is activated.

14. The monitoring device as set forth in claim 12 for monitoring a robotic device whose main support is supported by means of a rotatable footing on a baseplate, wherein said monitoring device comprises at least two sensors arranged at an angle to each other on the baseplate of the robotic device which cooperate with the sensor active faces arranged in the region of the floor so that in predefined shifted positions of the robotic device one of the sensors is activated.

15. The monitoring device as set forth in claim 11 for monitoring a robotic device the robotic arm of which is shiftable in the horizontal direction and in relation to the main support only along an axis, wherein said second sensor is configured to monitor the retracted horizontal position of the robotic arm.

16. A production system including a monitoring device configured in accordance with any of the preceding claims, the production system comprising at least one robotic device as well as a machine tool and/or a crib which can be loaded or unloaded by means of the robotic device, wherein a sensor active face is arranged in the zone of the crib to be loaded or unloaded by means of the robotic device or of the machine tool to be loaded or unloaded such that the first sensor is activated by each sensor active face when the robotic device is in the loading zone or unloading zone of the corresponding crib or the corresponding machine tool and that the second sensor is arranged on the robotic device such that a defined horizontal position of the robotic arm, particularly its retracted position can be sensed.

17. The production system as set forth in claim 16, wherein the horizontal extent of each sensor active face is selected so that when the corresponding sensor is activated the robotic device can be travelled by a predefined amount and/or rotated about a predefined angle.

18. The production system as set forth in claim 16, wherein said second sensor is activated when the robotic arm is in a retracted resting position.

19. The production system as set forth in claim 16, wherein said sensing controller will only okay a motion to the robotic device when at least one of the at least two sensors is in the activated condition.

20. The production system as set forth in claim 16, wherein an okay to motion to the robotic device by means of the sensing controller is negated when none of the two sensors is in the activated condition.

21. The monitoring device as set forth in claim 7, wherein said sensing controller controls the robotic device such that enabling horizontal movement of the robotic device as a whole is only allowed when the second sensor is activated.

22. The production system as set forth in claim 17, wherein said second sensor is activated when the robotic arm is in a retracted resting position.

23. The production system as set forth in claim 17, wherein said sensing controller will only okay a motion to the robotic device when at least one of the two sensors is in the activated condition.

24. The production system as set forth in claim 18, wherein said sensing controller will only okay a motion to the robotic device when at least one of the two sensors is in the activated condition.

25. The production system as set forth in claim 17, wherein an okay to motion to the robotic device by means of the sensing controller is negated when none of the two sensors is in the activated condition.

26. The production system as set forth in claim 18, wherein an okay to motion to the robotic device by means of the sensing controller is negated when none of the two sensors is in the activated condition.

27. The production system as set forth in claim 19, wherein an okay to motion to the robotic device by means of the sensing controller is negated when none of the two sensors is in the activated condition.

* * * * *